Nov. 19, 1968  C. LEDOUX  3,411,180
PLASTIC EXTRUSION MACHINE
Filed Oct. 5, 1966
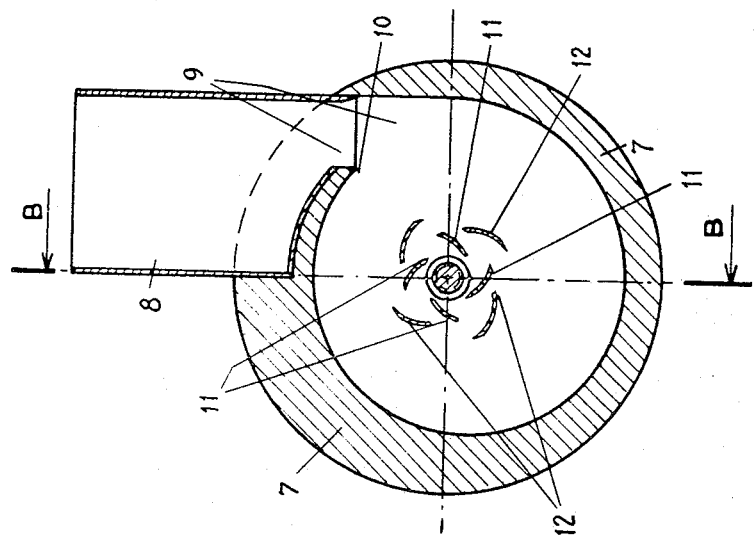
FIG. I
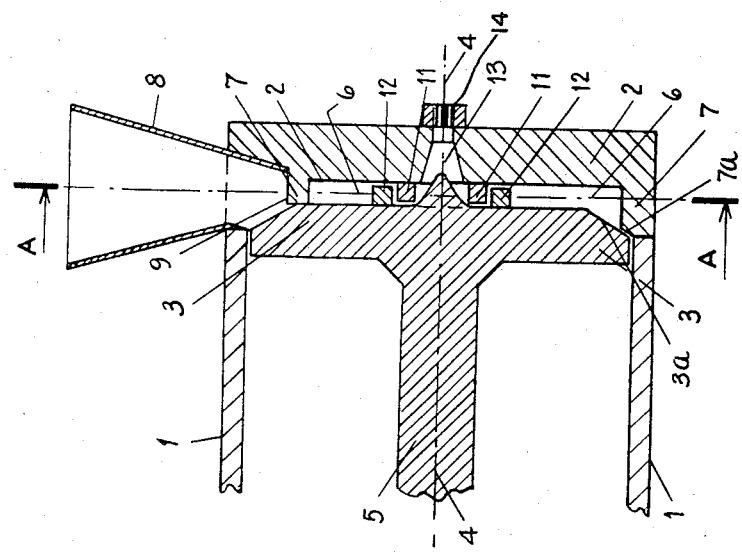
FIG. 2
INVENTOR.
CLAUDE LEDOUX
BY
McDougall, Hersh, Scott & Ladd
ATTYS 3,411,180
PLASTIC EXTRUSION MACHINE
Claude Ledoux, Antony, France, assignor to Produits Chimiques Pechiney-Saint-Gobain, Neuilly-sur-Seine, France
Continuation-in-part of application Ser. No. 549,321, May 11, 1966. This application Oct. 5, 1966, Ser. No. 584,438
Claims priority, application France, Apr. 27, 1966, 59,304
5 Claims. (Cl. 18—12)

ABSTRACT OF THE DISCLOSURE

An apparatus for extrusion of plastic materials which includes a housing having a stator in the form of a stationary disc plate, a rotor in the form of a disc plate corresponding to the stator and arranged in face to face relationship therewith, a circular cavity in the portion of the stator facing the rotor with a rim about the cavity to define an air gap between the rotor and stator, a die opening through the central portion of the stator for the extrusion of plastic material therethrough, a feed opening through a portion of the rim in the stator in communication with the air gap for the introduction of plastic material to be processed through the apparatus, the circular cavity in the face of the stator being eccentric to the rotor, and a beveled edge portion in the surface of the rotor facing the stator with a complementary beveled portion in the corresponding portion of the stator to provide a nested relationship between rotor and stator to enable turning movement of the rotor relative the stator with a minimum of play therebetween and in which the die opening may be fitted with a spinneret having a plurality of narrow openings for the extrusion of fine streams of plastic material from which fibers may be drawn.

---

This is a continuation-in-part of my copending application Ser. No. 549,321, filed May 11, 1966, now Patent No. 3,364,522 and entitled "Plastic Extrusion Machine."

In the aforementioned application, description is made of an apparatus for the extrusion of high polymeric materials, in which the apparatus comprises a rotor and a stator in which the latter has a hollow cylindrical section arranged eccentrically with respect to the axis of the rotor and in which the periphery more or less outlines the gelling and shearing zones for the plastic material to be extruded. A feed hopper communicates with the periphery of the stator and the central portion of the stator embodies an extrusion nozzle or spinneret through which the plastic material is extruded. The rotor and the stator are each provided with a plurality of small deflector blades on their respective inner surfaces and arranged in a circular arc or spiral coaxial with the spinneret to enhance the homogeneity of the plastic material and its displacement towards the spinneret.

It is an object of this invention to provide a method and means which improves upon the extrusion device described and claimed in the aforementioned copending application, which can be used for the extrusion of articles and fibers and which offers a number of other economical and operational advantages.

These and other objects and advantages of this invention will hereinafter appear and for purposes of illustration, but not of limitation, an embodiment of the invention is shown in the accompanying drawing, in which—

FIG. 1 is a sectional view taken along the line A—A of FIG. 2 across the central axis of the device midway between the rotor and stator, and FIG. 2 is a sectional view taken along the line B—B of FIG. 1 along the central axis of the extrusion machine.

An important feature of this invention resides in the improvement that is experienced in the extrusion machine of the aforementioned copending application when the surface of the rotor facing the stator is formed with a bevel in the outer peripheral portion with a corresponding smaller bevel, preferably but not essentially being provided in the cooperating portion at the periphery of the stator. The beveled or chamfered portions in the rotor and stator permit a nested relationship to be established therebetween which minimizes the amount of play while enabling free rotational movement of the rotor relative the stator even when the apparatus is empty.

Another improvement comprises the location of a perforated spinneret coaxially of the rotor and shaped to impart the desired cross-section to the mass that is extruded and in which the spinneret communicates with the circular cavity in the stator by way of a truncated orifice and in which the spinneret can be formed with small passages extending therethrough for the generation of fibers.

By reason of the foregoing modifications, the gap or circular cavity has at its base an additional hollow which is made available by the beveled portions of the rotor, the edge of the stator and the flat inner plane of the rotor. The shape of the hollow is defined by an external wall in the form of the surface of a cylinder, when viewed along a semi-plane drawn through the axis of the gap, which is limited to the axis about which it turns; the section cut along the plane will be in the form of right angle triangles, the hypotenuse of which will range from zero to the width of the bevel of the rotor or, in other words, following the sense of rotation of the semi-plane, the maximum dimensions of the hypotenuse will be located on one side of the opening through which the hopper feeds in the gap and the minimum dimension will be located on the other side.

The material which enters the cavity is moved inwardly towards the spinneret in response to rotation of the rotor and the arrangement of the blades whereby the material travels along a spiral path from the periphery towards the central portion of the gap. The movement is accelerated in response to the beveled hollow on the lateral surface of the roller. The section in the gap for the extrusion of the material diminishes in the direction of movement of the material from the inlet to the exit into the spinneret with a corresponding gradual increase in pressure on the material and acceleration in the movement thereof. The plastic material, which is reduced to the plastic state during passage through the gap, issues across the truncated hollow machined into the stator having its axis coinciding with the axis of the rotor.

The arrangement of stationary small blades on the stator and the blades which turn with the rotor operates to direct the plastic material towards the spinneret with a shearing action of the type which markedly increases the frictional forces which add to the temperature of the material for further reduction in viscosity to a level which enables flow to the spinneret. The period of time that the plastic material is exposed to this rather high heat is relatively short so that no decomposition will take place.

When the spinneret is formed with the many passages of small dimension extending therethrough, the fibers that are extruded can be wound upon a drum in the manner well known to the art. The extruded fibers are preferably maintained in a heated state, as by means of a cylindrical oven, infrared radiation or the like heating means located adjacent the outlet from the spinneret to enable attenuation of the extruded fibers to achieve the desired small dimension. Other intermediate treatment, such as sizing, lubricating and the like, can be applied to the fibers before they are wound on the drum.

Referring now to the drawing for an illustration of the device embodying the features of this invention, the rotor 3 and the stator 2 are arranged in face to face relation in the frame 1. The rotor and stator may be heated by conventional means (not shown), such as by the formation of the rotor and stator with internal passages through which a thermostatically controlled heat transfer fluid can be circulated.

The rotor 3 is formed in its face opposite the stator 2 with a bevel 3a about its outer peripheral edge portion. The rotor is adapted to be turned about its central axis 4 by suitable driving means, such as a motor, belt, motor driven gears, or the like (not shown), operatively connected to the rotor shaft 5. The gap between the rotor 3 and the stator 2 is in the form of a hollow or cavity cut or otherwise formed in the face of the stator between the rim or end walls 7. A bevel 7a is preferably formed in the end wall portion adjacent the beveled portion 3a of the rotor and in substantially parallel relationship therewith to enable a nested relationship to be established therebetween which minimizes the amount of play necessary for rotational movement of the rotor relative the stator. The cavity 6, forming the hollow in the face of the stator, is arranged eccentrically with respect to the rotor. This eccentric arrangement, coupled with the shape of the cavity, including the beveled portion 3a of the rotor and 7a of the stator, provides the condition whereby the half section of the cavity 6, limited by its axis, the surface of the beveled portion 3a of the rotor on one side and the surface of the stator on the other side decreases in the direction of rotation of the rotor from a maximum area at one side of the feed inlet opening 9 from the hopper 8 to a minimum one on the other side or leading edge of the feed opening. The hopper 8, which is positioned on the top side of the stator, communicates through the feed opening 9 first with the cavity and then with the beveled portion 3a of the rotor. The described eccentricity of the opening in the stator results in the formation of an abutment 10 at the leading edge of the feed opening which prevents return of plastic material from the cavity into the hopper.

A plurality of small blades extend inwardly into the cavity from the face of the stator while another set of small blades 12 extend inwardly into the gap from the face of the rotor with the blades 11 and 12 being fixed to the stator and rotor respectively, as described in the aforementioned copending application.

The movement of the plastic material is in the direction from the outer periphery of the cavity towards the spinneret at the center through an opening 13 of truncated shape formed in the face of the stator in coaxial alignment with the axis of the rotor. The spinnerets 14 are formed with perforations of various shapes, dimensions and numbers, depending somewhat upon the character of the plastic material extruded and the shape of the product desired. The spinnerets are interchangeable one with another in the machine by replacement one for another in the outlet of the opening 13.

Various modifications can be made without departing from the spirit of the invention. For example, instead of forming the cavity 6 of circular section, the cavity can be formed of spiral shape. Similarly, the small blades 11 and 12 can be provided in the form of arcuate members, as illustrated, or of spiral shape. The faces of the rotor and stator can be machined to form striations or grooves therein for more effective engagement and displacement of the plastic material.

Having described the basic elements of the extrusion device, illustration will now be made of its use in the preparation of fibers of polyvinyl chloride resin, it being understood that other extruded products and shapes can also be obtained.

First the rotor and stator are brought up to temperature and the rotor is rotated about its axis. When the desired temperature and speed of rotation has been achieved, the polyvinyl chloride resin is introduced from the hopper 8, through the feed opening 9, into the hollow base 6 between the stator and rotor. The plastic material flows freely in to the space and is therein subjected to a number of forces which tend to drive the plastic material in a direction towards the spinneret. The material first moves away from the feed opening 9 and the rotary motion imparted to the material by the rotor is transformed into a spiral movement by the small blades 11 and 12 whereby pressure is exerted onto the material for flow to the spinneret. As illustrated in the drawing, the small blades are arranged in separate circular paths about the spinneret opening 13 with the stator blades 11 disposed about an inner circle while the rotor blades 12 are disposed in an outer circle for rotation in a path beyond the path of the inner blades 11. The rotor blades 12 are angled outwardly from the leading edge to the trailing edge, when measured in the direction of rotation, and the stator blades are angled in the opposite direction, thereby to effect a mixing action which enhances the homogeneity of the material, the displacement thereof and the work performed on the plastic material.

In the absence of the beveled portions 3a and 7a, it is difficult to maintain continuous and uniform propulsion of the plastic material from the feed opening to the spinneret, especially when operating the machine at high capacity. As a result, the material issuing from the spinneret lacks homogeneity and the perforations in the spinneret often become clogged with solid material. This indicates that, in the absence of such beveled portions, use is incapable of being made of the device for the preparation of continuous fibers.

The following is a sample of the construction of an extruder embodying the features of this invention:

An extruder adapted for the preparation of fibers of polyvinyl chloride is typically formed of a rotor having a diameter of 180 mm. spaced 5 mm. from the stator and with a beveled portion having a width of 15 mm. The spinneret is formed of a diameter of 60 mm. with 350 passages of 1.5 mm. each extending therethrough.

Banks of infrared ray lamps are located on opposite sides adjacent the exit from the spinneret sufficiently to slow the cooling of the extruded streams of polyvinyl chloride resin to enable attenuation of the streams into fibers.

The rotor is driven by a motor at a rate of 100 r.p.m. Both the rotor and stator are formed with channels extending therethrough for the circulation of a heating fluid at a temperature of about 200° C. The polyvinyl chloride resin, containing 1% by weight of the stabilizer, is introduced in the form of fine particles, having an Afnor viscosity index of 80 (NF–T51 013). The resin is fed continuously, during the operation of the machine, at a rate of 18 kg. per hour.

It takes several seconds of feed before the material commences to be extruded from the spinneret. The extruded streams pass the banks of heaters and are wound on a drum rotating at a peripheral speed of about 50 meters per minute thereby rapidly to attenuate the streams of plastic material into fine fibers which are now hardened sufficiently to permit winding on the drum without adhesions.

Fibers are obtained which have a glossy appearance and which are dimensioned at about 122 denier with an average diameter of about 100 microns. Their contraction in oil at 120° C. or in chlorinated solvent is small. The fibers have high strength and they do not show loss in weight when aged for a long period of time at 50° C. Microscopic examination of the fibers reveals a transparent fiber having a substantially uniform diameter throughout its length.

It will be understood that changes may be made in the details of construction, arrangement and operation without departing from the spirit of the invention, especially as defined in the following claims.

I claim:
1. In an apparatus for the extrusion of plastic ma- terial including a housing having a stator in the form of a stationary disc plate, a roto in the form of a disc plate corresponding to the stator and arranged in face to face relationship therewith and mounted for rotational movement relative to the stator, means for rotating the rotor, a circular cavity in the face of the stator which faces the rotor with a rim about the cavity to define an air gap between the rotor and stator, a die opening through the central portion of the stator for the extrusion of plastic material therethrough, and a feed opening through a portion of the rim in the stator in communication with the air gap for feeding plastic material to be processed into the space between the rotor and stator, the improvement comprising a beveled edge portion in the surface of the rotor facing the stator and a complementary beveled portion in the corresponding portion of the stator facing the rotor with a nested relationship therebetween to enable turning movement of the rotor relative the stator with a minimum of play.

2. An apparatus as claimed in claim 1 in which the circular cavity in the face of the stator is eccentric to the axis of the rotor.

3. An apparatus as claimed in claim 1 which includes a plurality of narrow blades extending inwardly from the adjacent faces of the stator and rotor into the air gap therebetween.

4. An apparatus as claimed in claim 1 in which the die opening has an entrant portion of conical shape.

5. An apparatus as claimed in claim 1 in which a spinneret is fitted in the die opening in which the spinneret has a plurality of small perforations extending therethrough for the extrusion of fibers.

References Cited
UNITED STATES PATENTS 3,364,522   1/1968   Ledoux _____ 18—12

WILLIAM J. STEPHENSON, *Primary Examiner.*